(12) United States Patent
Reinke et al.

(10) Patent No.: US 12,209,696 B2
(45) Date of Patent: Jan. 28, 2025

(54) IRRIGATION SYSTEM PIPE COUPLING

(71) Applicant: Reinke Manufacturing Company, Inc., Deshler, NE (US)

(72) Inventors: Russell Scott Reinke, Deshler, NE (US); Jon Patrick Henry, Deshler, NE (US)

(73) Assignee: Reinke Manufacturing Company, Inc., Deshler, NE (US)

( * ) Notice: Subject to any disclaimer, the term of this patent is extended or adjusted under 35 U.S.C. 154(b) by 264 days.

(21) Appl. No.: 17/976,232

(22) Filed: Oct. 28, 2022

(65) Prior Publication Data

US 2024/0142031 A1    May 2, 2024

(51) Int. Cl.

| F16L 37/12 | (2006.01) |
| A01G 25/02 | (2006.01) |
| A01G 25/09 | (2006.01) |
| F16L 37/50 | (2006.01) |

(52) U.S. Cl.
CPC .......... *F16L 37/1235* (2013.01); *A01G 25/02* (2013.01); *A01G 25/09* (2013.01); *F16L 37/50* (2013.01)

(58) Field of Classification Search
CPC ...... F16L 37/1235; F16L 37/50; A01G 25/02; A01G 25/09; A01G 25/092
See application file for complete search history.

(56) References Cited

U.S. PATENT DOCUMENTS

| 2,469,516 A | * | 5/1949 | Pearson | F16L 37/252 |
| | | | | 285/376 |
| 3,608,826 A | * | 9/1971 | Reinke | A01G 25/092 |
| | | | | 239/731 |
| 3,777,979 A | * | 12/1973 | Ririe | A01G 25/092 |
| | | | | 239/730 |
| 4,290,556 A | * | 9/1981 | McConnell | A01G 25/092 |
| | | | | 239/731 |
| 5,226,677 A | * | 7/1993 | Peter | D21F 5/028 |
| | | | | 285/190 |
| 2024/0008430 A1 | * | 1/2024 | Dudik | A01G 25/097 |
| 2024/0011586 A1 | * | 1/2024 | Dudik | F16B 7/185 |

* cited by examiner

*Primary Examiner* — James M Hewitt, II
(74) *Attorney, Agent, or Firm* — Shook, Hardy & Bacon L.L.P.

(57) ABSTRACT

This disclosure relates to an irrigation system pipe joint or span coupling, which can connect a span of an irrigation system to another structure. In examples, the joint can include various components that attach an end of a first pipe or joint to an end of a second pipe or joint. For example, the end of the first joint can include a receiver plate, which can include a recess with a bushing. In addition, the end of the second joint can include a post, hook, or other elongated member that, in order to connect the first joint to the second joint, is insertable into the bushing.

5 Claims, 8 Drawing Sheets

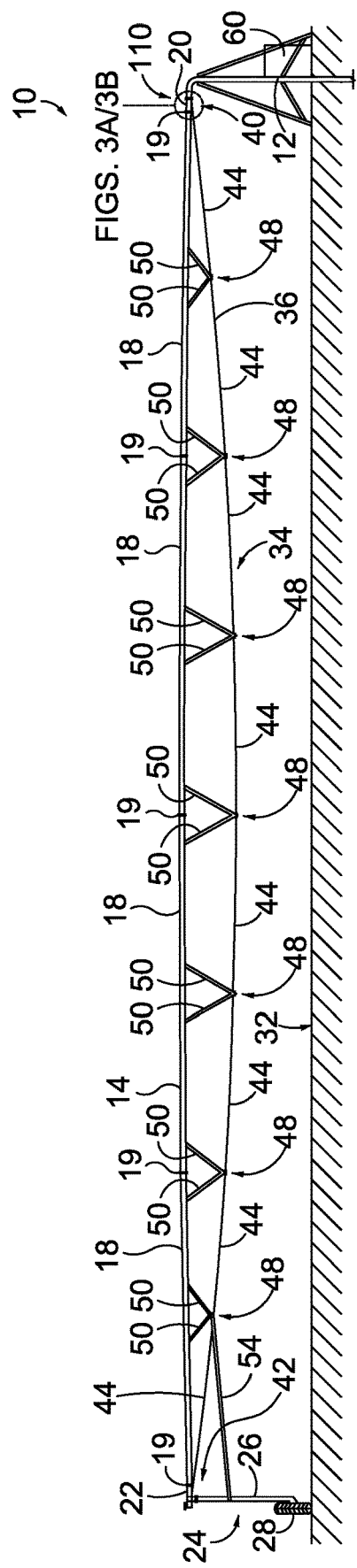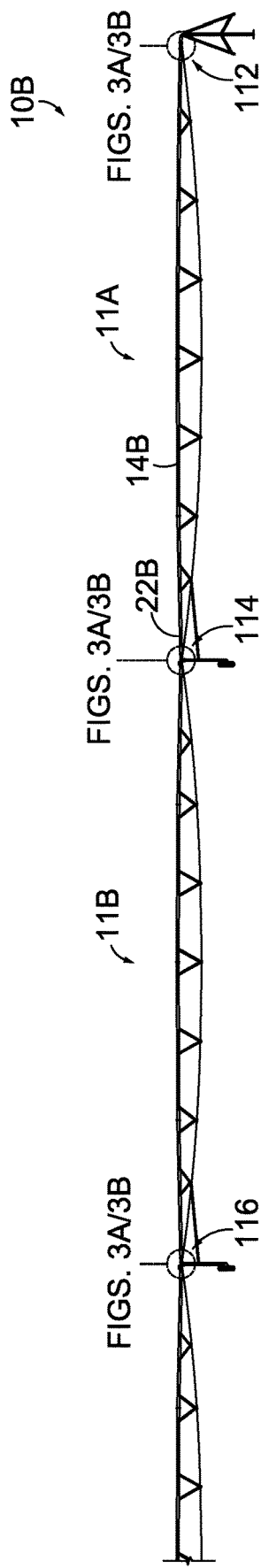

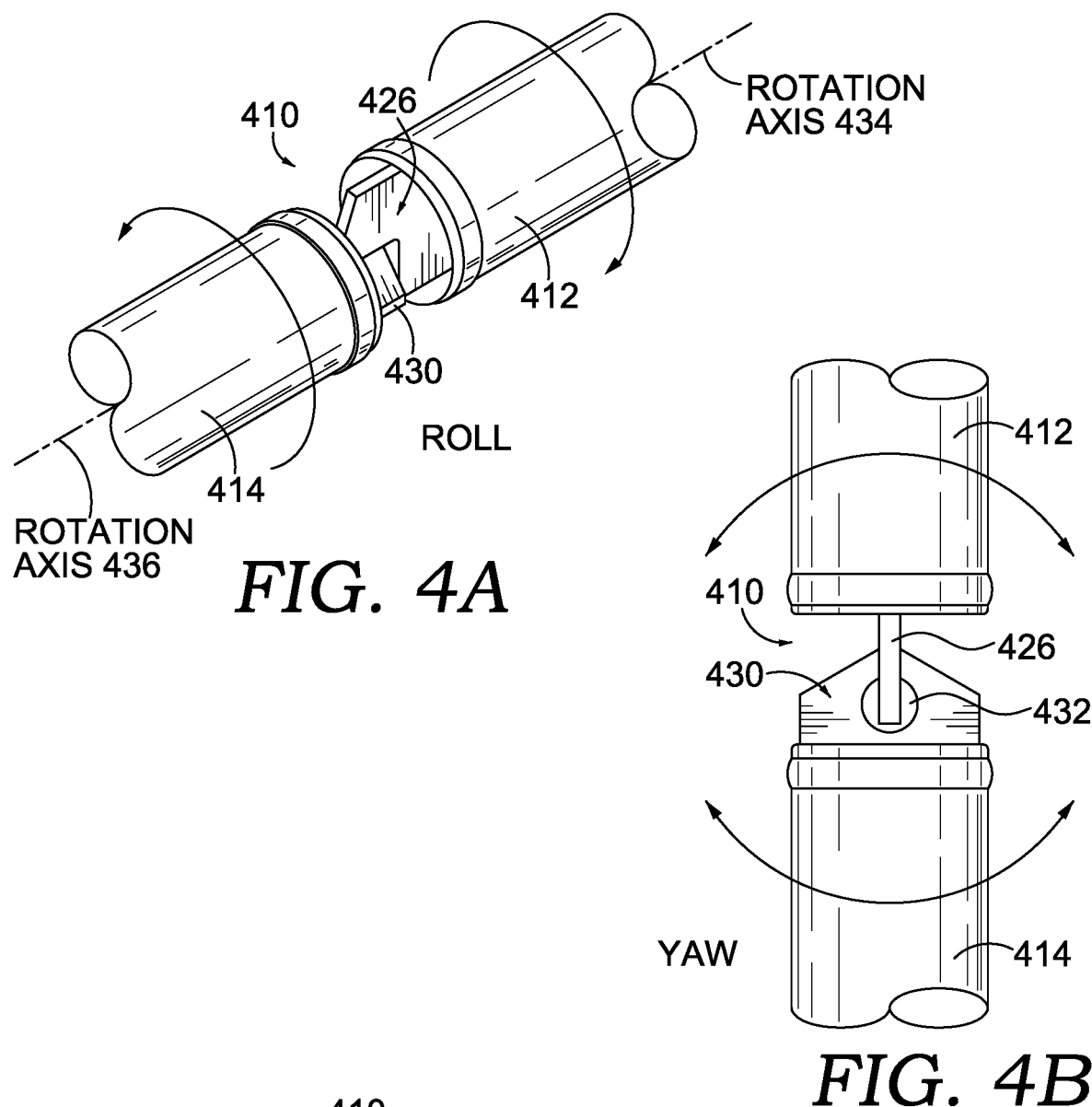
FIG. 4A
FIG. 4B
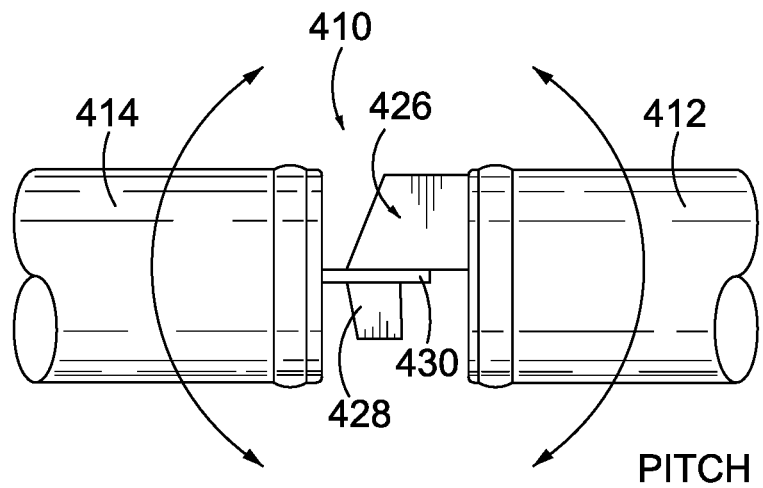
FIG. 4C

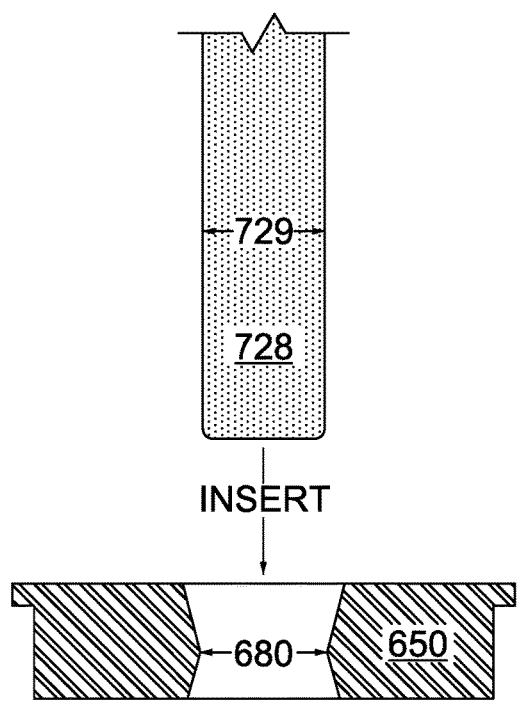
FIG. 7A
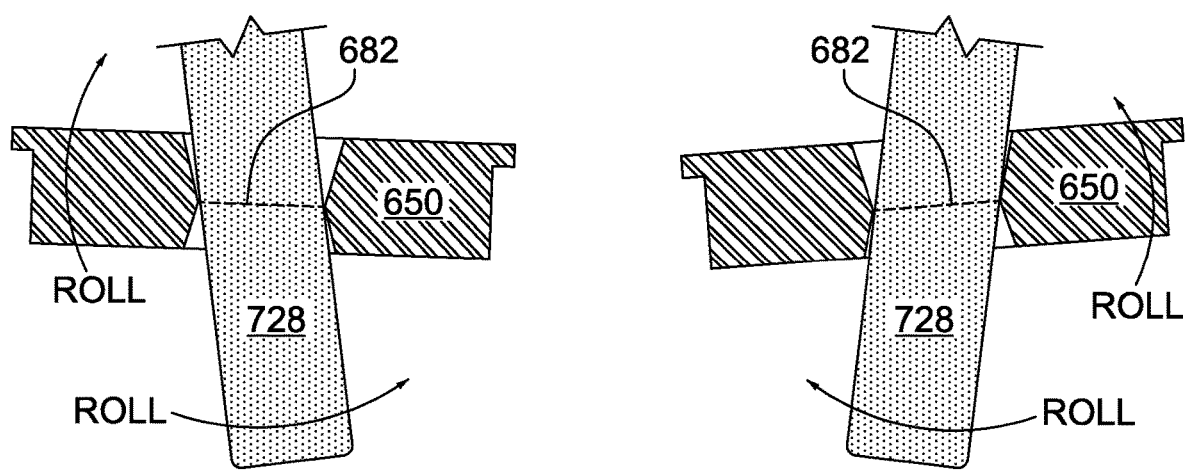
FIG. 7B
FIG. 7C

IRRIGATION SYSTEM PIPE COUPLING

BACKGROUND

Irrigation systems, such as those used in agriculture, often include one or more lengths of fluidly connected pipes. In some instances, a length of pipe is connected, at a joint, to another structure, such as another length of pipe or drive tower (e.g., a motorized unit that moves/traverses the pipe(s) across a field and either in a circular motion or laterally). Often, the joint connecting the pipe to another structure can allow for the pipe to move relative to the joined structure. For example, the joint may include, on one of the pipe or the joined structure, a male connector (e.g., such as a post, an end of a hook, or a ball) that mates with a recess on the other of the pipe or the joined structure.

DETAILED DESCRIPTION OF DRAWINGS

The present systems and methods for an irrigation system pipe coupling are described in detail below with reference to these figures.

FIG. 1 depicts a front elevation view of an irrigation system, in accordance with examples of this disclosure.

FIG. 2 depicts a series of spans of an irrigation system, the spans being connected by joints, in accordance with examples of this disclosure.

FIGS. 4A, 4B, and 4C depict degrees of motion, including roll, yaw, and pitch, that can occur at a joint of an irrigation system, in accordance with examples of this disclosure.

Figure 5:
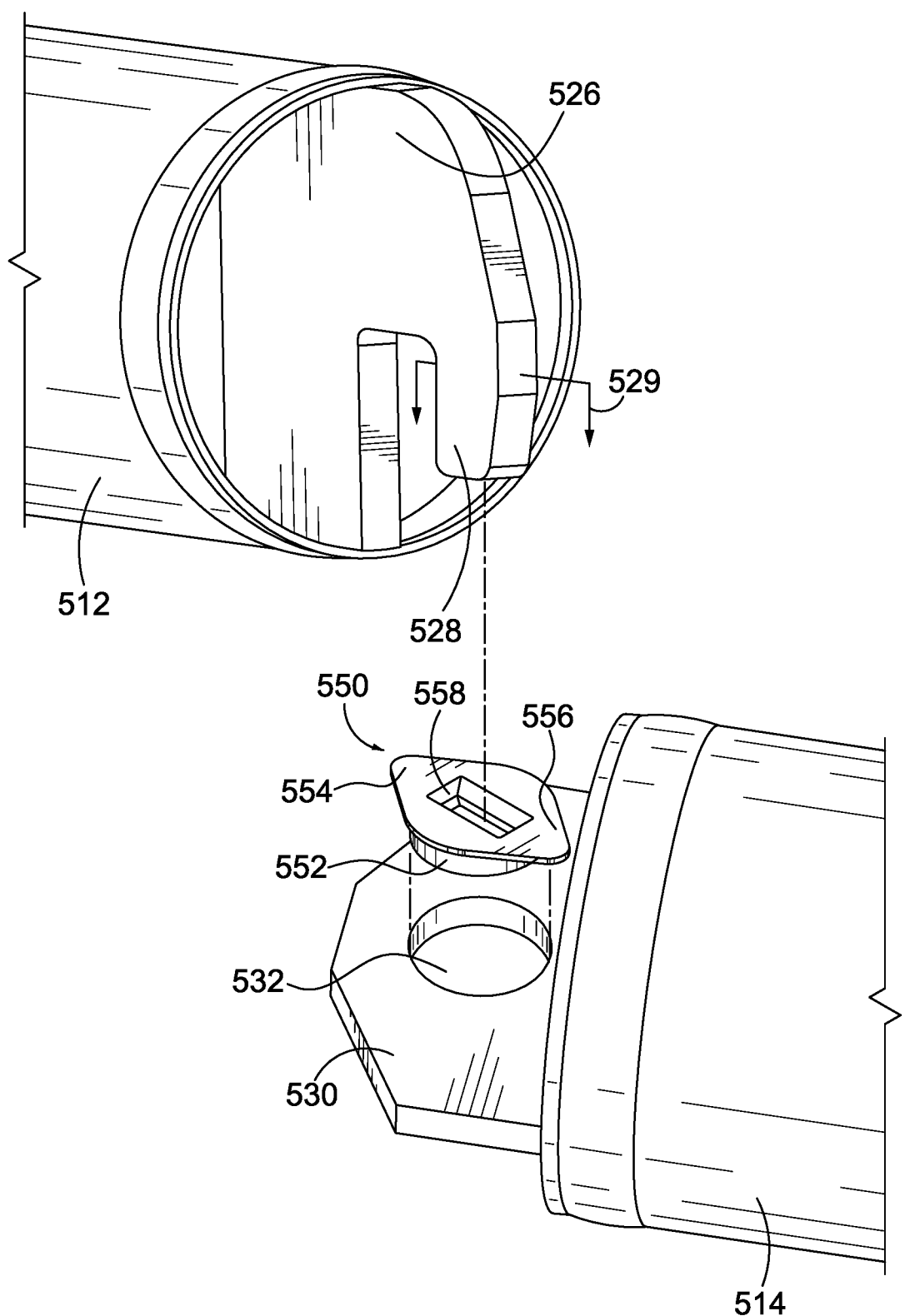

FIG. 5 depicts a disassembled view of at least a portion of a span coupling of an irrigation system, including a bushing, in accordance with examples of this disclosure.

Figure 6A:
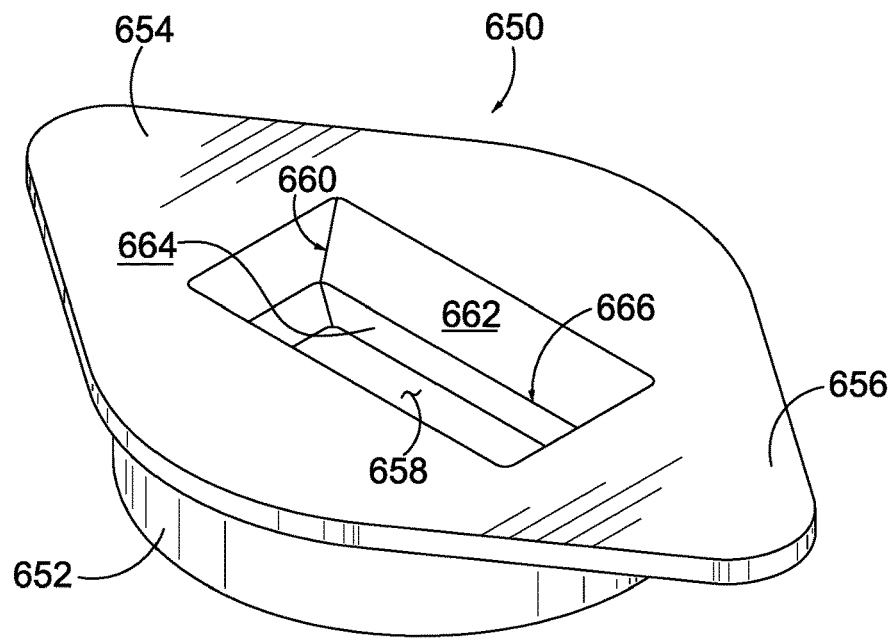
Figure 6B:
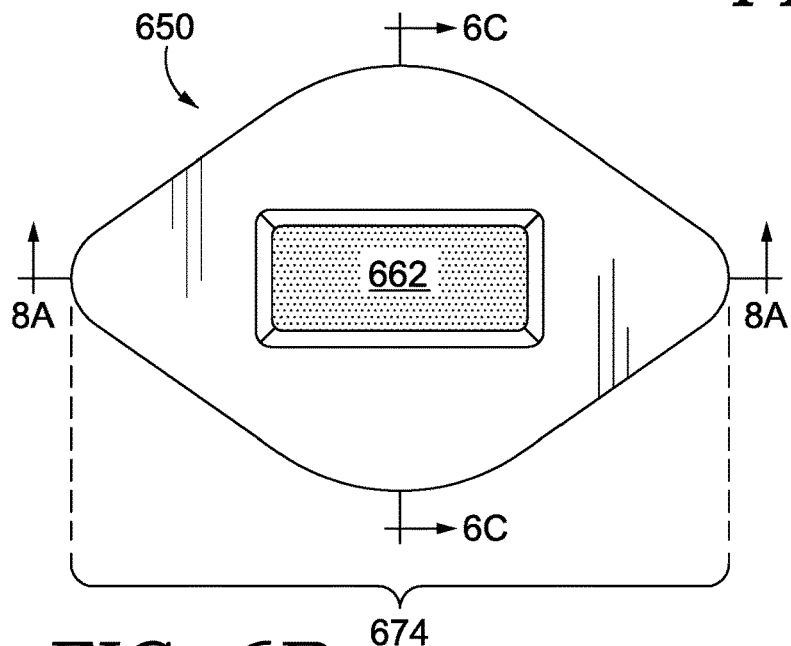
Figure 6C:
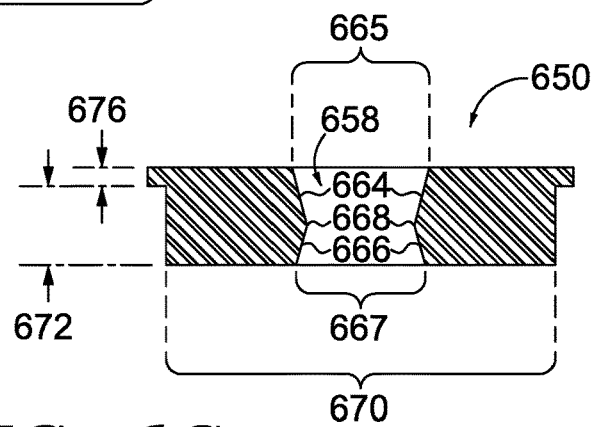

FIGS. 6A, 6B, and 6C depict various views of a bushing, in accordance with examples of this disclosure.

FIGS. 7A, 7B, and 7C depict cross-sectional views of a portion of a hook and a bushing, including interactions and movements therebetween, in accordance with examples of this disclosure.

Figure 8A:
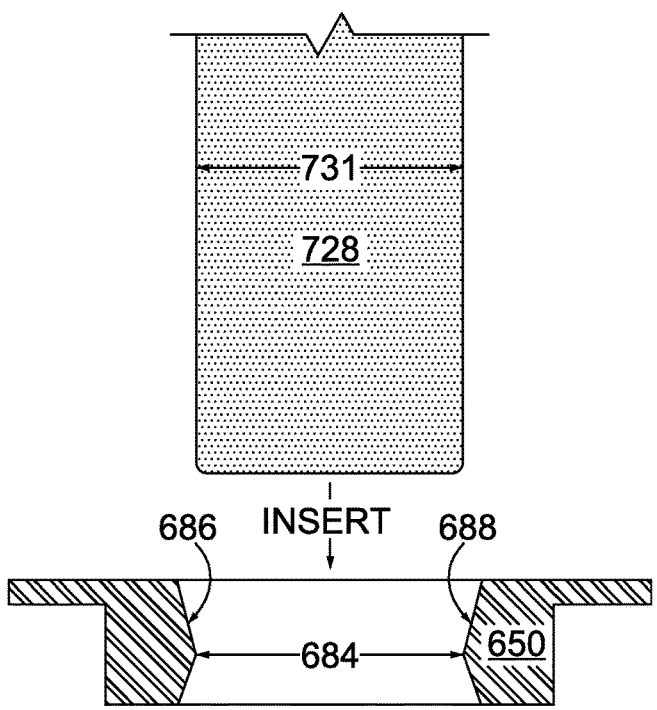
Figure 8B:
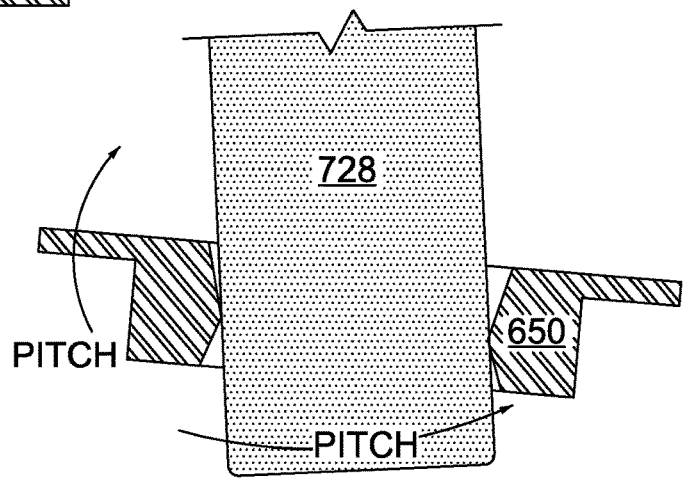
Figure 8C:
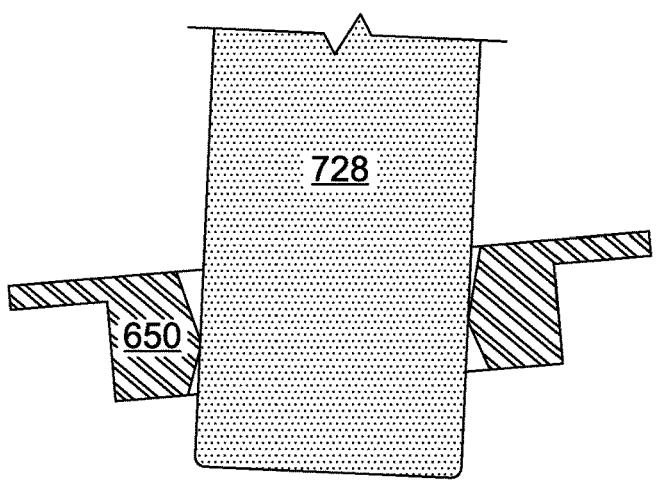

FIGS. 8A, 8B, and 8C depict cross-sectional views of a portion of a hook and a bushing, including interactions and movements therebetween, in accordance with examples of this disclosure.

Figure 9:
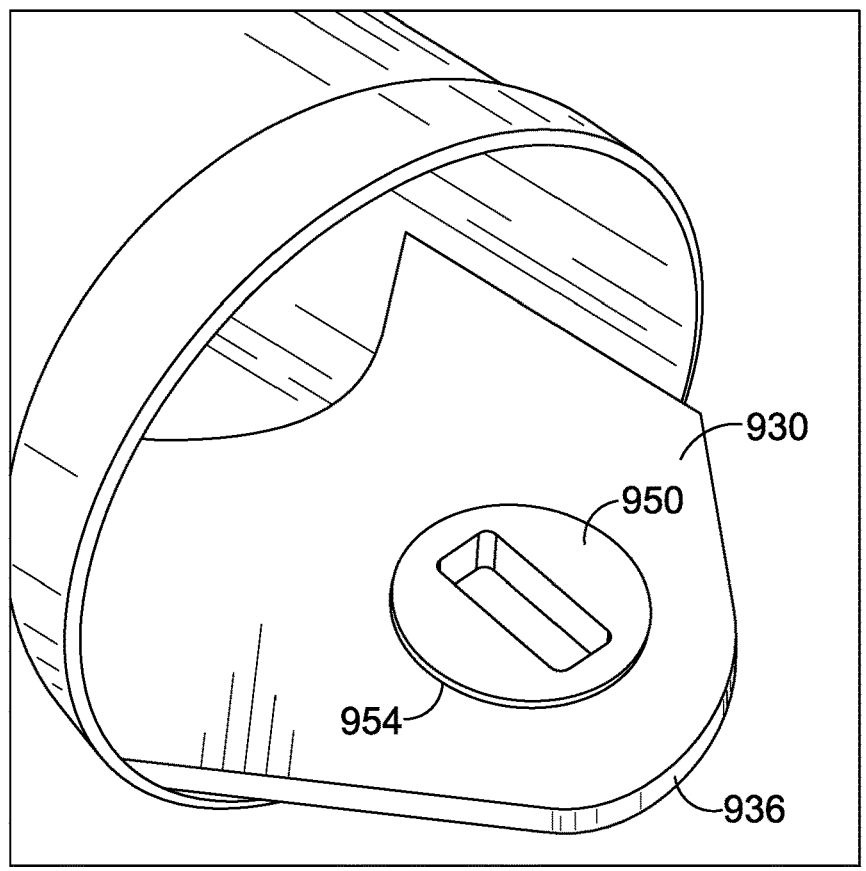

FIG. 9 depicts a receiver assembly of a joint, in accordance with examples of this disclosure.

Figure 10:
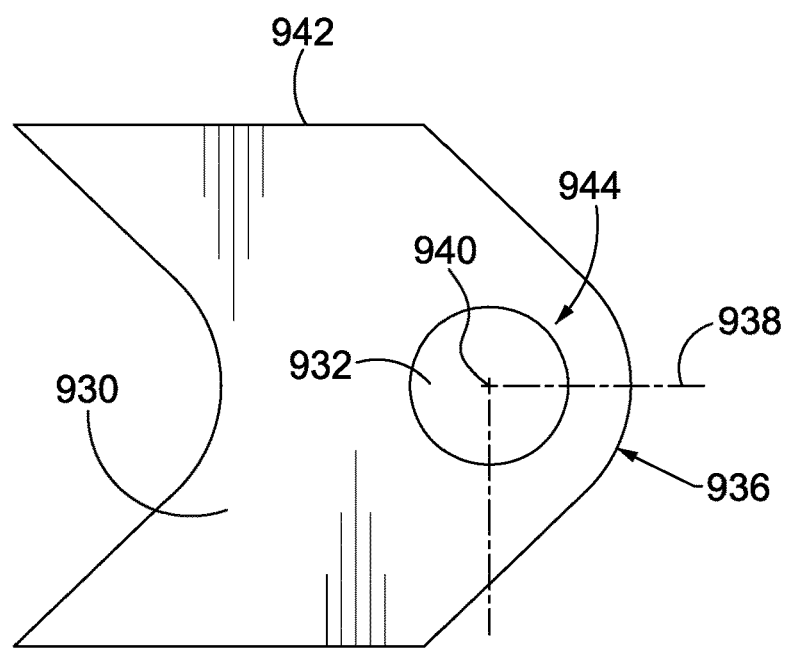

FIG. 10 depicts a receiver plate in accordance with examples of this disclosure.

DETAILED DESCRIPTION

This detailed description is related to an irrigation system pipe joint, which can connect a span of an irrigation system to another structure and can enable the span to more efficiently rotate or pivot in one or more axes of motion with reduced part wear. In examples, the joint can include various components that attach an end of a first pipe or joint to an end of a second pipe or joint. For example, the end of the first joint can include a receiver plate, which can include a recess with a bushing. In addition, the end of the second joint can include a post, hook, or other elongated member that, in order to connect the first joint to the second joint, is insertable into the bushing. In examples, based on the elongated member (e.g., post, hook, or other) being inserted into the recess and bushing, the first joint and/or the second joint can rotate relative to one another. Furthermore, based at least in part on the bushing, relative movement between the joints can be efficient and associated with reduced part wear or reduced damage (e.g., of the recess and the elongated member) and a precision alignment connection can be achieved between joint members.

In examples, the bushing can have various elements that contribute to efficient pipe motion and reduced part wear or reduced damage. In some instances, the bushing can include a recess configured to receive the elongated member. For instance, the bushing recess may include a profile shape and/or size that corresponds with an elongated member. As such, the elongated member closely mates with the receiver plate, which can reduce excess shifting of the elongated member in the receiver plate recess and can increase the likelihood that relative motion of the first pipe and the second pipe occurs at a common, center of rotation (e.g., where the pitch, yaw, and roll axes intersect).

In some examples, the bushing recess can include one or more surface features that can contribute to efficient pipe motion and reduced part wear or reduced damage. For example, perimeter walls of the bushing recess can include one or more chamfers or curved edges, which can transition from a wider opening to a narrower central portion (e.g., waist). As such, the bushing can closely fit around the elongated member, and the elongated member can rotate or pivot with limited resistance when retained in the bushing.

Among other things, the span coupling (e.g., including a bushing) enables spans of an irrigation system to efficiently maneuver along multi-axial motion paths. For example, a bushing, as described herein and based on the close fit with the elongated member, can limit erratic movement (e.g., side-to-side, fore-and-aft, etc.) of a hook plate relative to a receiver plate. As such, based on the limited erratic movement, the span coupling maneuvers at a relatively consistent rotation axis. In addition, the bushing can reduce friction associated with yaw-type rotation of the coupled parts (e.g., as the bushing spins in the receiver plate recess).

Having described some examples of this disclosure at a high level, reference is now made to FIG. 1 illustrating an example of an irrigation system 10. The illustrated irrigation system 10 is a section of a center-pivot type irrigation system that revolves or rotates around a fluid source 12. In other examples, irrigation system may be a linear or lateral-move irrigation system, or any other type of irrigation system, and the claimed subject matter associated with this disclosure can be implanted in either a center-pivot type irrigation system or a lateral-move irrigation system.

The illustrated irrigation system 10 includes a pipeline 14 coupled to the fluid source 12. The pipeline 14 extends from the fluid source 12 to a tower 24. The pipeline 14 may comprise a plurality of pipe segments 18 coupled to one another, or to other segments, at pipe junctions 19. In other aspects, the pipeline 14 may comprise a single pipe segment. The pipeline 14 may include one or more different types of sprinklers for dispersing various applications on a field.

Figure 3A:
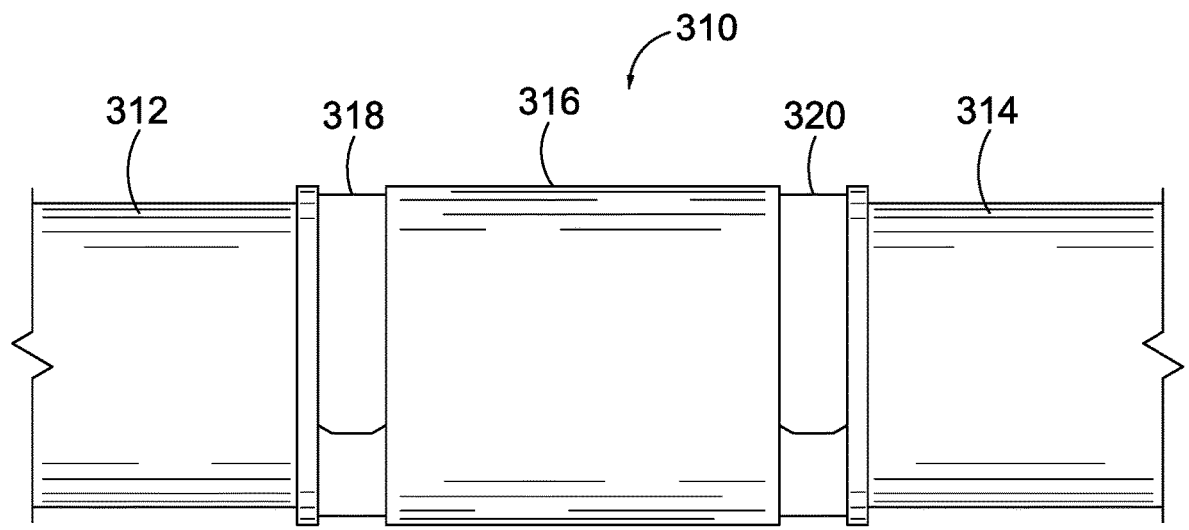
FIGS. 3A and 3B depict a span coupling of an irrigation system, in accordance with examples of this disclosure.
Figure 3B:
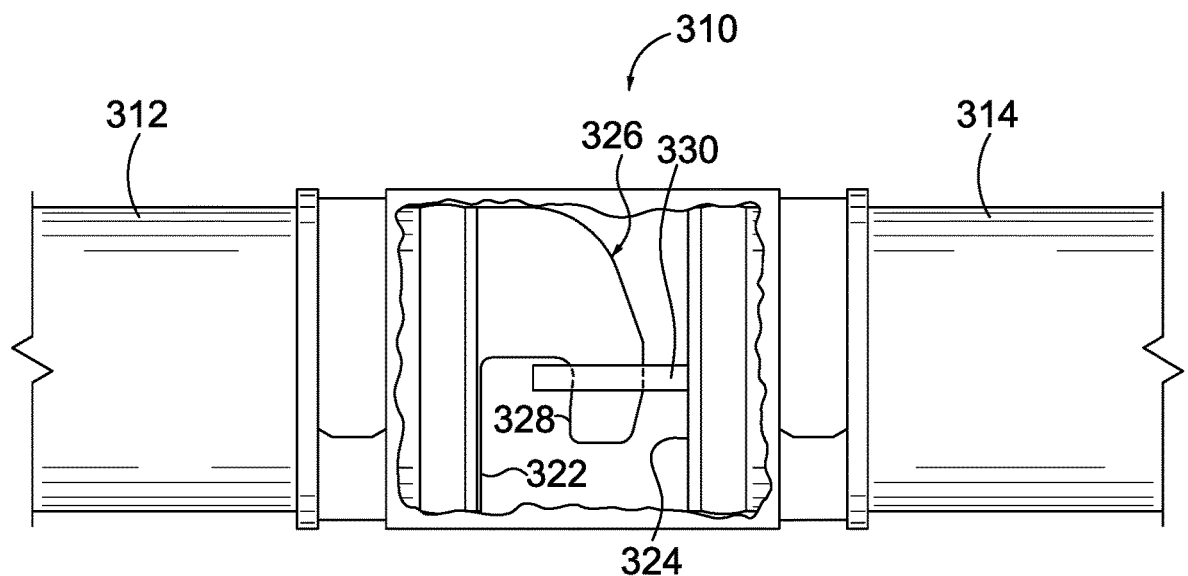

A first segment 20 of the pipeline 14 may connect to the fluid source 12 with a span coupling 110 (shown in greater detail in FIGS. 3A and 3B and described more in other portions of this disclosure). The first segment 20 may include the span coupling, or a portion of the span coupling (e.g., a hook), for detachably coupling to the fluid source 12. The span coupling may comprise a hook-and-receiver-type span coupling. For example, the first segment 20 may include a hook that may be detachably coupled to a receiver (e.g., a ring) connected to the fluid source 12. In examples, the receiver can include a recess with a bushing, and based at least in part on the bushing, relative movement between the first segment 20 and the fluid source 12 can be efficient and associated with reduced part wear or reduced damage (e.g., of the recess and the elongated member). Such a span coupling can provide a highly efficient point of rotation for the pipeline 14 when placed in the center of the pipeline 14.

In the illustrated aspect, the pipeline 14 is capped at a last segment 22. It may be advantageous in some examples, however, to provide a multi-span irrigation system to permit irrigation of a greater area. For example, referring to FIG. 2, the irrigation system 10b can include a first span 11a, and one or more additional spans 11b (e.g., ancillary spans, swing arms, etc.) can be attached to the first span 11a. Thus, the multi-span irrigation system 10b can be composed of two or more spans (e.g., the irrigation span 11a, span 11b, etc.). In this example, the second span, ancillary span, or swing arm may be coupled to the last segment 22b of the pipeline 14b of the irrigation system 10b to increase the area over which the combined irrigation system travels. Thus, the last segment 22b of the pipeline 14b may include a span coupling 114 (e.g., a hook and a receiver), or a portion of a span coupling, (e.g., a receiver) for connecting to a span coupling (e.g., a hook) of the second span, ancillary span, or swing arm. Hook-and-receiver-type span couplings are one type, but other types of span couplings may also be useful with the present invention. The multi-span irrigation system 10b can include one or more additional span couplings 116, which can be similar to the span coupling 110, 112, and/or 114.

The tower 24 supports the last segment 22 of the pipeline 14. In other aspects, the tower 24 may support an intermediate portion of the pipeline 14 resulting in a portion of the pipeline 14 cantilevered past the tower 24. The tower 24 includes one or more support legs 26 and one or more wheels 28. In some aspects, the tower 24 is self-propelled and includes a drive unit that causes the wheels to rotate to carry the pipeline 14 over a field 32. In other aspects, other equipment (e.g., electronics) may be mounted on the tower 24, such as for controlling the drive unit.

Furthermore, the irrigation system 10 includes a control panel 60 for controlling operations of the irrigation system, such as by sending control signals to the drive unit on the tower 24 (e.g., to control speed), to a pump (e.g., to control flow rate), etc. The control panel 60 is illustrated affixed near the center pivot, and in other aspects, the control panel 60 may be affixed to other parts of the irrigation system 10. The control panel 60 may include a user interface (e.g., graphical user interface) for receiving inputs (e.g., application rate) from a user to control operations of the irrigation system 10. In other aspects, the control panel 60 may include a communications interface for sending and receiving signals (e.g., wireless signals or wired signals). As such, the control panel 60 may wirelessly receive user input remotely and may wirelessly send data (e.g., measured speeds, speed variance, etc.) to a remote location (e.g., server, user computing device, etc.).

A truss system 34 includes a first truss rail 36 and a second truss rail (obscured from view in FIG. 1 on the other side of the system 10). In some aspects, a truss system may include only one truss rail. In other aspects, the truss system may include more than two truss rails. The first truss rail 36 and the second truss rail are substantially similar and the following description of the first truss rail 36 applies equally to the second truss rail. A first end 40 of the first truss rail 36 is coupled to the first segment 20 of the pipeline 14. Likewise, a second end 42 of the first truss rail 36 is coupled to the last segment 22 of the pipeline 14. The first truss rail 36 includes a plurality of headed truss rods 44 coupled end-to-end between a pair of cooperating mating members at each of one or more intermediate joints 48.

The truss system 34 includes a plurality of pairs of struts 50 extending from the pipeline 14 with which they are coupled via conventional means (e.g., fastened to a plate that is welded to the pipeline 14). Each pair of struts 50 additionally is coupled to each other at one of the intermediate joints 48. The truss system 34 further includes a plurality of cross-members that are also obscured from view and that extend from one of the intermediate joints 48 of the first truss rail 36 to an intermediate joint of the second truss rail and spaces the intermediate joints, and thereby the first and second truss rails apart. In the illustrated embodiment, a brace 54 also extends from the tower 24 to one of the intermediate joints 48 to provide additional support and to stabilize the tower 24. In some aspects, one or more of the intermediate joints may comprise flying joints that do not have a strut 50, a cross-member 52, or a brace 54 attached. Thus, these flying joints include only adjacent truss rods 44 coupled end-to-end between the pair of cooperating members.

In some examples, as depicted in FIGS. 1 and 2, the systems 10 and 10b can include one or more span couplings 110, 112, 114, and 116. Referring now to FIGS. 3A and 3B, an example span coupling 310 is described in more detail, and any of the span couplings 110, 112, 114, and 116 can include the span coupling 310. In examples of the present disclosure, the span coupling 310 includes a first joint 312 coupled to a second joint 314, and the joints 312 and 314 can include a pipe segment or other tubular structure. In addition, span coupling 310 can include a boot 316, hose, or other flexible tube structure that is coupled to the joints 312 and 314 (e.g., such as via boot connectors 318 and 320, such as clamps), and for illustration purposes, the boot 316 is depicted as partially cutaway in FIG. 3B. In examples, the first joint 312 includes a first terminal end 322; the second joint 314 includes a second terminal end 324; and the boot 316 encloses the interstitial space between the terminal ends 322 and 324. In some examples, the boot 316 and the connectors 318 and 320 functionally seal the connection between the joints 312 and 314, such as to allow for fluid to be contained or flowed through the joints 312 and 314 with minimal leaking.

With continued reference to FIG. 3B, in some examples, the first joint 312 and the second joint 314 are connected via one or more structures that facilitate relative movement therebetween. In addition, the flexibility of the boot 316 allows for the connection between the pipes to remain relatively sealed, even when the joints 312 and 314 move relative to one another. For instance, in at least some examples, the first joint 312 includes a hook 326 (e.g., hook plate) coupled to the first terminal end 322, and the hook 326 can include a point 328. Although the span coupling 310 includes the hook 326, in other examples, the span coupling 310 can include alternative structures with elongated members that are structurally similar to the point 328, such as posts, pins, and the like. In examples, the hook 326 can include a dimension (e.g., height) that is similar to the inner diameter of the joint 312, and the hook 326 can be welded or otherwise fused to the inner wall/surface of the joint 312. In some examples, the second joint 314 includes a receiver plate 330 with a recess configured to mate with the point 328 of the hook 326, and similar to the hook 326, based on the receiver plate 330 having a dimension similar to the inner diameter of the joint 314, the receiver plate 330 can be welded (or otherwise fused) to the inner wall/surface of the joint 314. In some examples, the point 328 can be inserted through the recess and retained in the recess to connect the first joint 312 to the second joint 314.

In examples, the span coupling 310, including the hook plate 326 and receiver plate 330, is robust, strong, and sufficient to support the load-bearing requirements of the span, while also providing multi-axial degrees of motion freedom. As such, one part of the span coupling (e.g., hook side) can maneuver (e.g., as the system traverses varied terrain) relative to the other part of the span coupling (e.g., receiver side). In some examples, within a span coupling 310, the receiver plate 330 may be positioned closer (relative to the hook plate 326) to the tower. For example, in span coupling 114, the receiver plate (or the joint 314) can be coupled to the span 11a, whereas the hook plate (or the joint 312) can be coupled to the span 11b. In other examples, within a span coupling 310, the hook plate 326 can be positioned at the tower. For example, the hook plate 326 can be installed tower-side with the point 328 pointed upwards and the receiver plate 330 (span side) can be installed atop the point 328 of the hook.

Referring now to FIGS. 4A, 4B, and 4C, examples of relative motion between pipes or joints are depicted. That is, FIGS. 4A, 4B, and 4C depict an example connection 410 between joints 412 and 414 that are similar to the joints 312 and 314. For example, the joints 412 and 414 includes a hook 426 and a receiver plate 430, respectively, and FIG. 4B depicts a recess 432 of the receiver plate 430, the hook 426 being received in the recess 432. In addition, the connection 410 between the joints 412 and 414 could include a boot, which is omitted from FIGS. 4A, 4B, and 4C for illustrative and explanatory purposes, and the flexibility of the boot can help maintain a seal between the joints 412 and 414 when the joints move relative to one another.

As explained above with respect to the joints 312 and 314, the joints 412 and 414 can include relative motion with respect to one another. For example, as depicted in FIG. 4A, the one or more of the joints 412 and 414 can rotate or "roll" around an axis (e.g., 434 and/or 436) that is coaxial with an axis or axes of the joints 412 and 414, such that the hook 426 (e.g., the point 428 (FIG. 4C) of the hook 426) rotates or pivots relative to the receiver plate 430. In addition, as depicted in FIG. 4B, one or more of the joints 412 and 414 can rotate or "yaw" around a rotation axis that is parallel with (e.g., coaxial with) an axis of the recess 432. Further, in some instances, one or more of the joints 412 and 414 can rotate or "pitch" around an axis that is perpendicular to one or more of the axes 434 or 436 and to the axis of the recess 432. In examples, the joints 412 and 414 can move in one or more of the degrees of motion represented by FIGS. 4A, 4B, and 4C (e.g., roll, yaw, and pitch).

In examples, components of the connection 310 or 410 (e.g., hook or hook plate and receiver plate) can be made of various materials, including ferrous and non-ferrous materials. In addition, the connections 310 and 410 are configures to support the load-bearing requirements of the span while also providing three degrees of freedom, for the span to maneuver and adjust as the system (e.g., 10 and 10b) traverse a ground surface. In addition to enabling the structural connections across the systems (e.g., at 110, 112, 114, and 116), the connections 310 and 410 can allow fluid to transfer from one span to the next. In examples, the hook plate 326 or 426 and the receiver plate 330 or 430 are designed to be internal to the irrigation pipes or joints about the central axis for system alignment and control. In examples, the hook plate and receiver plate connection being proximate to the centerline of the irrigation pipe (e.g., aligned with the axes 434 and 436) can also provide a more accurate connection on rough terrain and can facilitate a higher degree of rotational movement (e.g., as compared to connections in which the plates are not aligned with the center line).

Referring to FIG. 5, in some examples of the present disclosure, the span coupling (or connection between pipes or joints) can include additional components to provide more efficient, consistent, and precise movement between the pipes and/or joints and to better align the pipes or joints. For example, FIG. 5 depicts a first joint 512 (e.g., similar to the joints 312 and 412) with a hook plate 526 and a second joint 514 with a receiver plate 530. In addition, the connection includes a bushing 550 that is insertable in the recess 532 of the receiver plate 530, and the bushing 550 can include various features configured to nest in the recess 532 and mate with the point 528 of the hook 526. For example, the bushing 550 can include a cylindrical or disc-like body 552 having a dimension (e.g., width, diameter, circumference, etc.) configured to fit within the recess 532 and one or more flanges 554 and 556 (e.g., triangular tabs or lobes or circumferential lip) that protrude outward from the bushing body 552 and support the bushing 550 relative to the receiver plate 530 (e.g., support the bushing 550 on top of the receiver plate 530). In at least some examples, the fit between the recess 532 and the body 552 can include an interference fit, and as used herein, an interference fit can include zero to negative clearance). In examples, as explained in other portions of this disclosure, the bushing 550 can be configured to reduce friction between the hook plate 526 and the receiver plate 530 (e.g., reduce metal-on-metal wear) and to more precisely align the hook plate 526 and the receiver plate 530.

In examples of the present disclosure, the point 528 of the hook 526 (or other elongated member) can include a two-dimensional profile at a cross section aligned with reference position 529 (e.g., in a reference plane that is perpendicular to the plate body of the hook 526 and is coaxial with the pipe 512). For example, the two-dimensional profile can include a rectangle. In addition, the bushing 550 can include a recess 558 at least partially enclosed around the sides by a perimeter wall comprising a recess perimeter profile shape that corresponds with the two-dimensional profile of the point 528. Furthermore, the dimensions of the recess (e.g., width) can be configured for tight fitment with the point 528 of the hook 526. In FIG. 5, the point 528 includes a relatively straight or linear configuration in the longitudinal axis (e.g., perpendicular to the reference position 529). For example, the edge 531 is relatively straight. In an alternative example, the edge 531 can be more curvilinear or arcuate.

In some examples, the bushing 550 can (e.g., based on a fit within the recess 532 and with the point 528) reduce erratic movement between the hook plate and the receiver plate, which can reduce metal-on-metal wear over time. In addition, the bushing 550 can be constructed of various materials (e.g., high-density polyethylene (HDPE) or ultra high molecular weight polyethylene (UHMWPE)) that reduce friction associated with the bushing 550 rotating, spinning, or turning within the recess 532. Further, liquid passing through the pipeline when in use can keep the bushing 550 lubricated and can lower the coefficient of friction, thus improving the bearing surface for the hook 526. In addition, when installed and providing a coupling between the hook 526 and the receiver plate 530, the bushing 550 can be under tension based on various forces acting on the bushing 550 from different directions (e.g., tension between the hook to bushing and between bushing to receiver). Among other things, these forces and the resulting tension can diminish motion in various directions (e.g. fore-to-aft and side-to-side), as the hook can remain seated against the receiver on the downstream side. In some examples (e.g., in both a center pivot or lateral-move system), water pressure in the pipeline can also contribute to the tension and seating of the bushing, and in the case of center pivots, the outward movement or bias can also contribute to these different forces acting upon the system. Furthermore, in some examples, the weight of the span can provide enough force to help retain the hook within the bushing (e.g., reduce the likelihood that the hook disengages. In addition, the boot (e.g., 316) that surrounds the hook and receiver plates can also help hold the coupling position together, which can reduce the likelihood that the connection becomes unseated. This can, in some instances, operate as a form of static restraint to the connection.

Referring to FIG. 6A, an example bushing 650 is depicted, and FIG. 6B depicts a plan view of the bushing 650. In addition, FIG. 6B illustrates a reference line 6C-6C associated with the cross-sectional view depicted in FIG. 6C. In examples, the bushing 650 can include similar elements to the bushing 550 (and vice versa). For example, the bushing 650 includes a bushing body 652, flanges 654 and 656, and a recess 658. In addition, the recess 658 includes a perimeter wall 660 that at least partially bounds and encloses sides of the recess 658, and based on the perimeter wall 660, the recess 658 can include a profile shape (e.g., rectangular). For instances, the plan view in FIG. 6B depicts an example rectangular profile shape 662, which is shown in stipple shading for illustration purposes.

In some examples, the perimeter wall 660 can include a one or more chamfers. For example, the perimeter wall 660 can include a top chamfer 664 (e.g., chamfered wall), such that the perimeter wall 660 tapers from a larger insertion opening 665 (e.g., through which the hook point 528 is inserted) to a narrower, central portion of the recess 658. In addition, the perimeter wall 660 can include a bottom chamfer 666, such that the perimeter wall 660 tapers from a larger exit opening 667 (e.g., from which the hook point 528 exits when inserted through the recess 658). In some examples, the top and bottom chamfers 664 and 666 can converge at a narrower waist 668 of the recess 658, and in some examples, the narrower waist 668 is positioned about half of a depth of the recess 658. The waist 668 can, in some examples, provide tight fitment on opposing sides of the point 528.

In some examples, the perimeter wall includes a top portion that circumscribes the busing recess and that comprises the top chamfer 664, a bottom portion that circumscribes the bushing recess and that comprises the bottom chamfer 666, and the top portion and the bottom portion converge at the narrowed recess waist 668 that also circumscribes the bushing recess. In the FIGS. 6A-6C, the top and bottom portions frame a rectangular recess, and in other examples, the top and bottom portions can frame a circular recess, which can be useful when the hook or other elongated member is cylindrical. Among other things, the bushing recess 658 comprising circumscribing chamfered portions can contribute to smooth transitions between, or combinations of, rolling and pitching.

The bushing 650 can include various other dimensions. For example, the bushing 650 can include a base width 670 (e.g., diameter) configured to fit snuggly within the recess 532 of the receiver plate 530 (e.g., an interference fit), as well as a base height 672 that is similar to a thickness of the receiver plate 530. In examples, based on the base width 670 being configured to snuggly fit within the recess 532, the bushing 650 can contribute to limited erratic movement (e.g., side-to-side and fore-to-aft) relative to the recess 532. In addition, the bushing can include a flange width 674 that is larger than the base width 670 and is configured to support the bushing 650 relative to (e.g., against or on top of) the receiver plate 530. In examples, the flange width 674 (as well as the flange thickness 676) can be configured to impede the bushing 650 from being pushed through the recess 532 of the receiver plate 530.

Referring to FIGS. 7A, 7B, and 7C, cross sections of the bushing 650 (e.g., similar to FIG. 6C) and a hook point 728 are depicted, the hook point 728 being insertable within the recess 658 of the bushing 650. In examples, the hook point 728 can include features similar to the point 528. Among other things, FIGS. 7B, and 7C depict roll movement (e.g., FIG. 4A) of the point 728 relative to the bushing 650 (e.g., the point 728 forming part of an installed hook plate and the bushing 650 being installed in a receiver plate).

The bushing 650 can include various features to contribute to efficient roll-type relative movement. For example, the bushing 650 can include a waist width 680 that is similar to a point thickness 729 (or thickness of other elongated member), which can contribute to a fit configured to control relative movement. In some examples, the fit between the hook and the bushing can include a "slip fit," and as used herein, a slip fit can include positive clearance between the parts. In some examples, the waist width 680 is within a range of about 1.0× to about 2.0× of the point thickness 729; or about 1.0× to about 1.5× of the point thickness 729; or about 1.0× to about 1.25× the point thickness 729. However, these tolerances are examples, and in some instances, the waist width 680 can be smaller than 1.0× of the point thickness 729 or can be larger than 2.0× of the point thickness 729. Among other things, the waist width 680 being similar to the point thickness 729 can reduce erratic (e.g., side-to-side) movement of the point 728 relative to the bushing 650 and to the receiver plate. In addition, as illustrated by FIGS. 7B and 7C, the waist 668 can function as a fulcrum 682 on which the point 728 pivots as one or more of the pipes rolls relative to the other.

FIGS. 7B and 7C illustrate roll-type movements. Referring to FIGS. 8A, 8B, and 8C, another example is illustrated, including cross-sections of the hook point 728 and the bushing 650 (based on the reference position 8A-8A identified in FIG. 6B). The bushing 650 can include various features to contribute to efficient pitch-type relative movement. For example, the bushing 650 can include a waist length 684 that is similar to a point thickness 731 (or thickness of other elongated member), which can contribute to a slip fit. In some examples, the waist length 684 is within a range of about 1.0× to about 2.0× of the point thickness 731; or about 1.0× to about 1.5× of the point thickness 731; or about 1.0× to about 1.25× the point thickness 731. However, these tolerances are examples, and in some instances, the waist length 684 can be smaller than 1.0× of the point thickness 731 or can be larger than 2.0× of the point thickness 731. Among other things, the waist width 684 being similar to the point thickness 731 can reduce erratic (e.g., for-to-aft in a direction coaxial with the pipes) movement of the point 728 relative to the bushing 650 and to the receiver plate. In addition, as illustrated by FIGS. 8B and 8C, the waist 684 can function as a fulcrum around which the point 728 pivots as one or more of the pipes pitches relative to the other.

FIG. 8A illustrates an embodiment in which the sides or walls 686 and 688 include one or more chamfers that can contribute to efficient movement of the hook plate and the receiver plate relative to one another. In other examples, the sides or walls 686 and 688 can be relatively flat, without a chamfer. In other examples, the sides or walls 686 and 688 can include, at the corner transitioning to the top flanged portion of the bushing 650, a rounded radius (e.g., R0.375) providing a gradual transition into the recess and a rocking surface for the point 728. In some examples, the sides or walls 686 and 688 can be relatively flat without a chamfer or rounded corner.

As depicted in FIGS. 7A-7C and 8A-8C, the bushing 650 (e.g., the recess 658) and the point 728 can include corresponding features, such as profile shapes and dimensions, that contribute to a relatively tight fit between the parts when the point 728 is inserted into the bushing 650. As such, when the hook point 728 and the receiver plate yaw (e.g., FIG. 4B) relative to one another, the bushing 650 can spin within the recess 532 to allow the hook plate to efficiently move (e.g., with low friction and reduced erratic movement) relative to the receiver plate. In addition, as described with respect to FIG. 5, when installed and providing a coupling between the hook and the receiver plate, the bushing 650 can be under tension based on various forces acting on the bushing 650 (e.g., tension forces between the hook and bushing, between the bushing and receiver, from the water pressure, and in center pivots, due to the outward motion). Among other things, these tensions or forces that can be in different directions can help maintain a stable coupling with relatively limited motion in various axes (e.g., fore-and-aft, side-to-side, etc.).

In other examples, the hook point 728 (or other elongated member) can include a circular cross section and the bushing recess can include a corresponding circular profile, such that the hook point 728 spins in the yaw axis relative to the bushing (as opposed to the bushing spinning relative to the receiver plate). Although the figures illustrate some movements independently of others, it is understood that the pipes can undergo movement in any combination of roll, yaw, and pitch. In examples, the bushing 650 facilitates efficient movement in any of these combinations and, based on the relatively tight fit of the components, around a relatively fixed rotation axis.

The span joints (e.g., 310) can include one or more other elements. For example, referring to FIGS. 9 and 10, an alternative receiver plate 930 is depicted. In examples, the receiver plate 930 includes a recess 932, and a bushing 950 can be inserted into the recess 932. In FIG. 9, the bushing 950 includes a circumferential flange (e.g., ring) 954 having a radius, and in other examples, the bushing 950 could include lobular flanges (e.g., 654 and 656 that together are diamond like). In still other examples, the bushing can include other flange designs, such as square, triangular, or other n-side polygons.

In at least some examples, the receiver plate 930 can include a leading edge 936 shaped with a semi-circular face, which begins at a midline 938 aligned with the center 940 of the recess 932 and extends a slight distance on either side before gradually transitioning to a flatter edge intersecting the side 942 of the receiver plate 930. Among other things, the portion 944 of the receiver plate 930 between the leading edge 936 and the recess 932 is configured to support (e.g., provide a shelf) a load associated with a hook plate (e.g., the hook plate, pipe connected to the hook plate, span associated with the pipe, etc.). In addition, the semi-circular leading edge 936 can provide a motion path along which the hook plate can slide, the motion path being relatively free from corners or edges that might interfere with the motion (e.g., yaw motion) of the hook plate. In other examples, the leading edge of the receiver plate can include bevels or other designs to provide a hook-plate support shelf that is relatively free from obstructions in the motion paths of the hook plate.

As described above, subject matter of this disclosure provides various advantages. Among other things, the span coupling (e.g., including a bushing) enables spans of an irrigation system to efficiently maneuver along multi-axial motion paths. For example, a bushing, as described herein, can limit erratic movement (e.g., side-to-side, fore-and-aft, etc.) of a hook plate relative to a receiver plate. As such, based on the limited erratic movement, the span coupling maneuvers at a relatively consistent rotation axis. In addition, the bushing can reduce friction associated with yaw-type rotation of the coupled parts (e.g., as the bushing spins in the receiver plate recess).

This detailed description is provided in order to meet statutory requirements. However, this description is not intended to limit the scope of the invention described herein. Rather, the claimed subject matter may be embodied in different ways, to include different steps, different combinations of steps, different elements, and/or different combinations of elements, similar or equivalent to those described in this disclosure, and in conjunction with other present or future technologies. The examples herein are intended in all respects to be illustrative rather than restrictive. In this sense, alternative examples or implementations can become apparent to those of ordinary skill in the art to which the present subject matter pertains without departing from the scope hereof.

The invention claimed is:

1. An irrigation system, including a fluid connected pipe, comprising:
   a first joint coupled to a second joint;
   the first joint comprising a first terminal end and a hook coupled to the first terminal end, the hook comprising a point having a rectangular profile shape in a cross section;
   the second joint comprising a second terminal end and a receiver plate affixed to the second terminal end, the receiver plate comprising a first recess; and
   a bushing positioned in the first recess, the bushing comprising a second recess, wherein:
   the second recess includes a perimeter wall comprising a recess profile shape;
   the recess profile shape corresponds with the rectangular profile shape; and
   the point of the hook extends through the second recess; and
   a boot that is affixed to the first joint and the second joint and that encloses the first terminal end, the second terminal end, the hook, the receiver plate, and the bushing.

2. The irrigation system of claim 1, wherein:
   the bushing and the first recess are associated with an interference fit;
   the perimeter wall of the second recess comprises:
   a first wall comprising a first chamfer extending from a larger opening of the second recess to a narrower waist of the second recess; and
   a second wall that opposes the first wall and that comprises a second chamfer extending from the larger mouth of the second recess to the narrower waist of the second recess; and
   the narrower waist is configured to provide a slip fit relative to the point.

3. The irrigation system of claim 1, wherein:

the second recess extends entirely through the bushing from a first opening on a first side of the bushing to a second opening on a second side of the bushing; and the perimeter wall of the second recess comprises a first wall that opposes a second wall:

the first wall comprising a first chamfer extending from the first opening and a second chamfer extending from the second opening and converging with the first chamfer; and the second wall comprising a third chamfer extending from the first opening and a fourth chamfer extending from the second opening and converging with the third chamfer.

4. The irrigation system of claim 1, wherein:

the first recess comprises a first radius; and the receiver plate comprises:

a first plate edge affixed, at a first position, to an inner wall of the second joint;

a second plate edge affixed, at a second position generally opposing the first position, to the inner wall of the second joint; and a leading plate edge extending from one side of the second joint to an opposing side of the second joint, the leading plate edge comprising a second radius concentrically arranged with respect to the first radius.

5. The irrigation system of claim 1, wherein:

the second recess extends entirely through the bushing from a first opening on a first side of the bushing to a second opening on a second side of the bushing; and the perimeter wall of the second recess:

a top portion that circumscribes the second recess and that comprises a first chamfer;

a bottom portion that circumscribes the second recess and that comprises a second chamfer; and the top portion and the bottom portion converge at a narrowed recess waist portion that circumscribes the second recess.

\* \* \* \* \*